No. 696,124. Patented Mar. 25, 1902.
C. H. WHEELER & F. W. KREMER.
MOLD FOR CURING TIRES.
(Application filed July 30, 1901.)
(No Model.) 2 Sheets—Sheet 1.
Fig. 1,
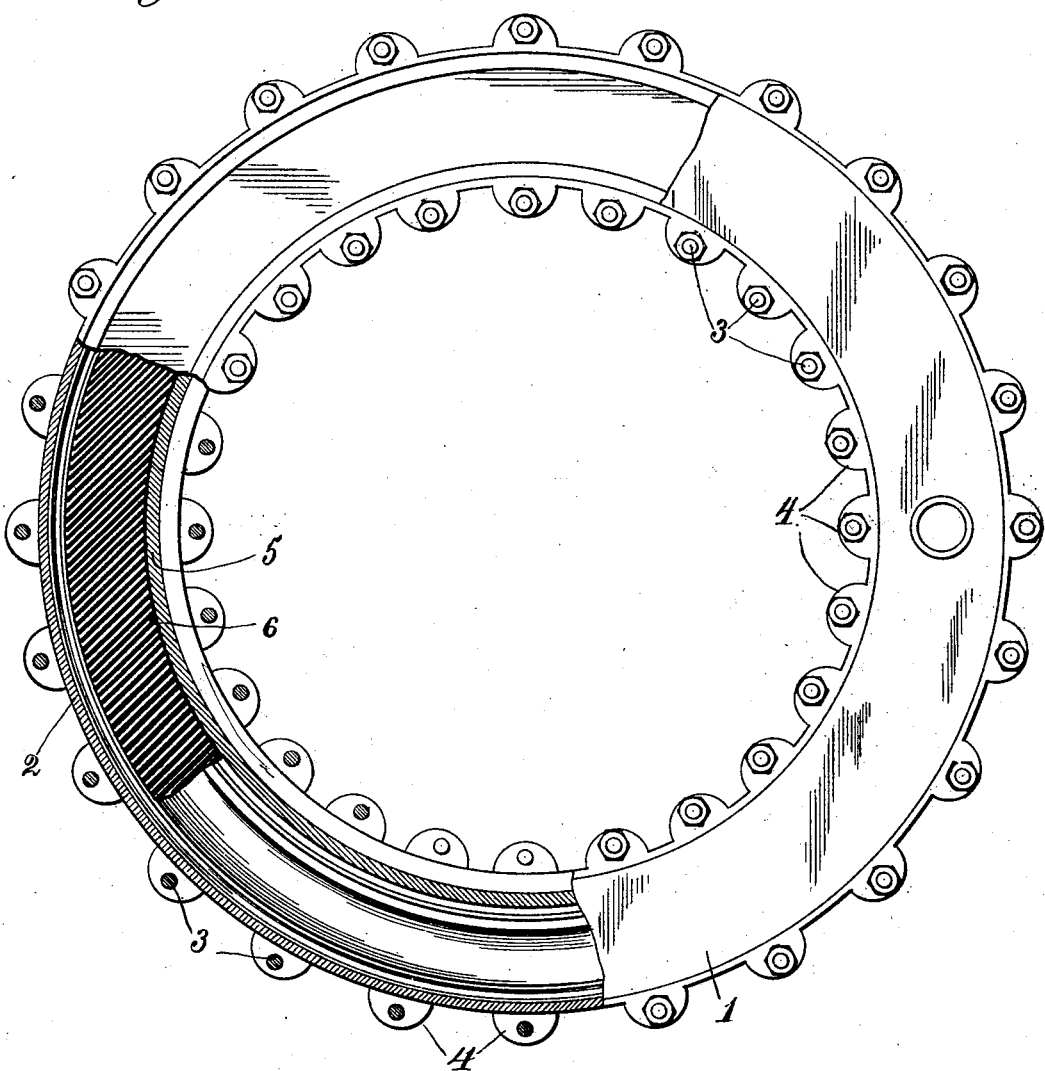

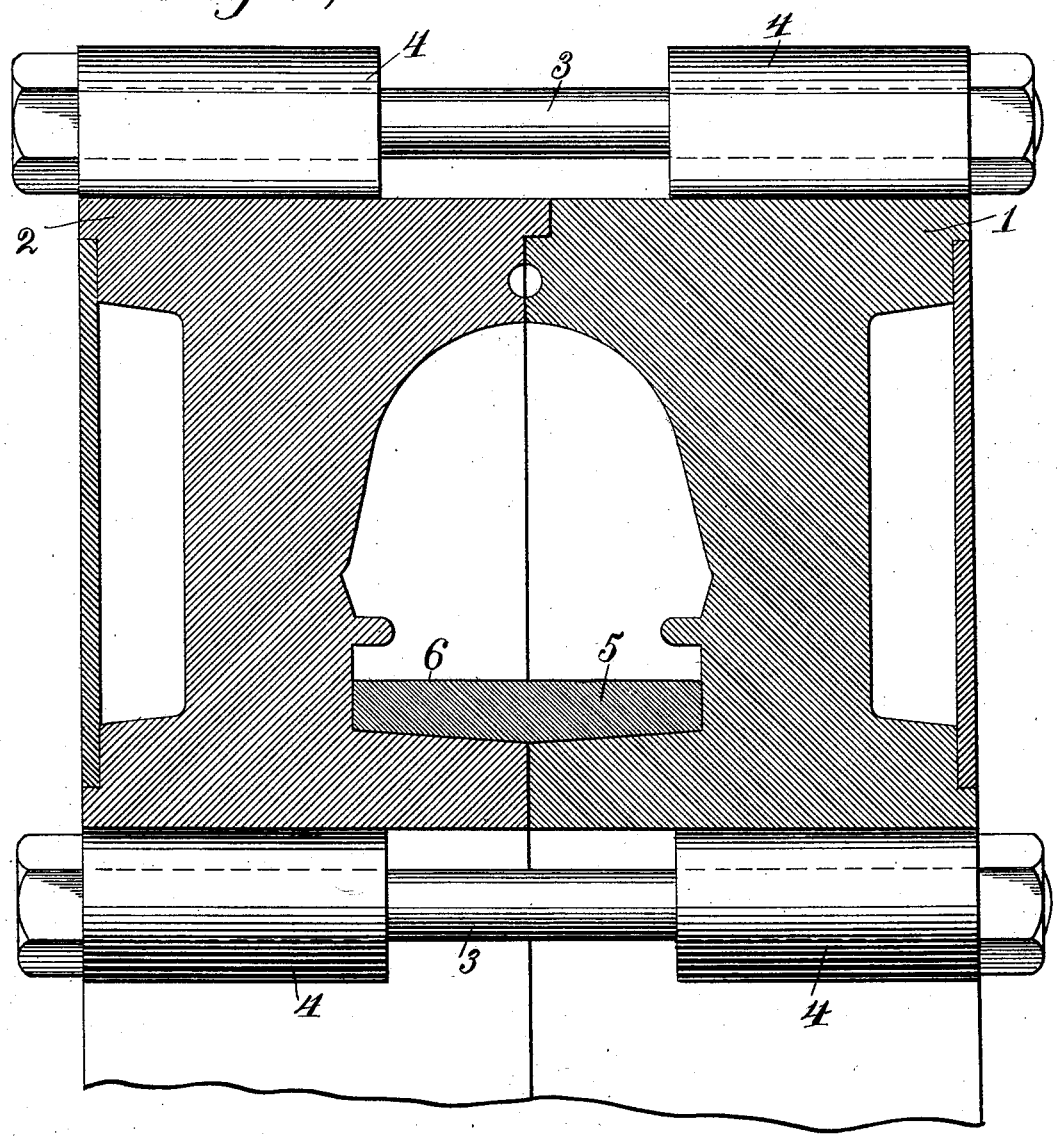

UNITED STATES PATENT OFFICE.

CHARLES H. WHEELER AND FRANKLIN W. KREMER, OF AKRON, OHIO; SAID WHEELER ASSIGNOR TO THE INDIA RUBBER COMPANY, OF AKRON, OHIO, A CORPORATION OF OHIO.

MOLD FOR CURING TIRES.

SPECIFICATION forming part of Letters Patent No. 696,124, dated March 25, 1902.

Application filed July 30, 1901. Serial No. 70,266. (No model.)

*To all whom it may concern:*

Be it known that we, CHARLES H. WHEELER, residing at No. 208 Silver street, and FRANKLIN W. KREMER, residing at No. 100 Rosedale avenue, city of Akron, county of Summit, and State of Ohio, citizens of the United States, have invented a new and useful Improvement in Molds for Curing Tires, of which the following is a specification.

The present invention relates to a new and improved mold for curing rubber tires, and particularly solid rubber tires.

The object of the invention is to provide, in connection with the mold, a means for supporting the tire in annular form, which means may be placed in the mold and after the curing or vulcanizing process is completed may be withdrawn from the mold while still supporting the vulcanized tire.

In the drawings we have shown a construction embodying our invention, in which—

Figure 1 is a view partly in plan, partly in central horizontal section, and partly broken away. Fig. 2 is a cross-sectional view on an enlarged scale.

Like numerals of reference refer to like parts in the several views of the drawings.

Referring to said drawings in detail, 1 represents the upper member of a mold, and 2 the lower member. Any desired conformation may be given the interior of the mold according to the desired form of tire being made. Also any means for securing the two sections of the mold together may be availed of; but in the drawings we have shown bolts 3 passing through lugs 4.

The essential feature of the invention resides in the ring or annulus 5, which is separable from the mold, and its upper surface 6 gives form to the base of the tire, while its lower surface is tapered from the center toward the edges in order to give the necessary mold draft.

In molding heavy vehicle-tires it is highly desirable that the tires should be made in annular form before insertion in the mold and that they should be maintained and supported in annular form until placed upon the wheel for which they are designed. This invention affords means whereby this may be accomplished.

The operation of forming a tire is as follows: After the cross-sectional shape has been given to the tire by any desired means it is made into a ring on the annulus 5, and while thus supported is placed, with the annulus, in the lower half of the mold. The upper half of the mold is then placed in position and the two sections secured together. Then the tire is subjected to the vulcanizing process, after which it is withdrawn, together with the annulus on which it is supported.

What is claimed as new is—

1. A tire-mold provided with a separable base portion in the form of an annulus.

2. A tire-mold provided with a separable base portion in the form of an annulus having its inner periphery tapered from the center to the edge.

In testimony whereof we have hereunto set our hands in the presence of two subscribing witnesses.

CHARLES H. WHEELER.
   FRANKLIN W. KREMER.

Witnesses:
 A. L. DICKINSON,
 MAME DARAN.